(12) United States Patent
Denoue et al.

(10) Patent No.: US 8,010,527 B2
(45) Date of Patent: Aug. 30, 2011

(54) SYSTEM AND METHOD FOR RECOMMENDING INFORMATION RESOURCES TO USER BASED ON HISTORY OF USER'S ONLINE ACTIVITY

(75) Inventors: Laurent Denoue, Palo Alto, CA (US);
Daniel Billsus, San Francisco, CA (US);
David Hilbert, Palo Alto, CA (US);
John Adcock, Menlo Park, CA (US);
Gene Golovchinsky, Menlo Park, CA (US)

(73) Assignee: Fuji Xerox Co., Ltd., Tokyo (JP)

( * ) Notice: Subject to any disclaimer, the term of this patent is extended or adjusted under 35 U.S.C. 154(b) by 548 days.

(21) Appl. No.: 11/771,799

(22) Filed: Jun. 29, 2007

(65) Prior Publication Data

US 2009/0006371 A1    Jan. 1, 2009

(51) Int. Cl.
*G06F 17/30* (2006.01)
*G06F 7/00* (2006.01)

(52) U.S. Cl. .................... 707/726; 707/727; 707/730

(58) Field of Classification Search ................ None
See application file for complete search history.

(56) References Cited

U.S. PATENT DOCUMENTS

| | | | |
|---|---|---|---|
| 6,285,999 B1 * | 9/2001 | Page | 707/5 |
| 6,539,375 B2 * | 3/2003 | Kawasaki | 707/5 |
| 6,990,633 B1 * | 1/2006 | Miyasaka et al. | 715/201 |
| 7,181,438 B1 * | 2/2007 | Szabo | 707/2 |
| 2002/0147641 A1 * | 10/2002 | Hickford et al. | 705/14 |
| 2005/0177486 A1 * | 8/2005 | Yeager | 705/37 |
| 2007/0038646 A1 * | 2/2007 | Thota | 707/100 |
| 2007/0043755 A1 * | 2/2007 | Rolleke | 707/102 |
| 2007/0073651 A1 * | 3/2007 | Imielinski | 707/3 |
| 2007/0100824 A1 * | 5/2007 | Richardson et al. | 707/7 |
| 2008/0005101 A1 * | 1/2008 | Chandra | 707/5 |
| 2008/0195601 A1 * | 8/2008 | Ntoulas et al. | 707/5 |

OTHER PUBLICATIONS

Akshay Java, et al., Feeds That Matter: A Study of Bloglines Subscriptions, ICWSM'2007, TR CS 06-06, Aug. 2006, Bouler, Colorado, USA, http://ebiquity.umbc.edu/get/a/publication/290.pdf.

Conor Hayes, et al., An Analysis of Bloggers and Topics for a Blog Recommender System, Workshop on Web Mining 2006 (WebMine), Sep. 18, 2006, Berlin, Germany.

Shinsuke Nakajima, et al., Discovering Important Bloggers Based on Analyzing Blog Threads, 2nd Annual Workshop on the Weblogging Ecosystem: Aggregation, Analysis and Dynamics, Chiba, Japan, May 10, 2005.

Pranam Kolari, et al., SVMs for the Blogosphere: Blog Identification and Splog Detection, AAAI Spring 2006 Symposia on Computational Approaches to Analysing Weblogs, AAAI-CAAW 2006, Mar. 27-29, 2006, Stanford University, California, USA.

(Continued)

*Primary Examiner* — Tim T Vo
*Assistant Examiner* — Sangwoo Ahn
(74) *Attorney, Agent, or Firm* — Sughrue Mion, PLLC (57) ABSTRACT

Blogs (and other information sources) are recommended to a user based history of user's online activities. The system: (1) processes the user's web history, (2) identifies blog posts (and web pages) that link to pages read by the user, (3) generates multiple relevance scores for each identified post/page, and (4) produces multiple rankings of the corresponding source blogs (and web sites) by aggregating individual relevance scores (or combinations of relevance scores), according to users' preferences. The system allows the discovery of information sources that are likely to be interesting to the user and allows sources lost in the "long tail" to be seamlessly discovered.

25 Claims, 6 Drawing Sheets

OTHER PUBLICATIONS

Bettina Berendt, et al., Finding your way through blogspace: Using semantics for cross-domain blog analysis, AAAI Spring 2006 Symposia on Computational Approaches to Analysing Weblogs, AAAI-CAAW 2006, Mar. 27-29, 2006, Stanford University, California, USA.

Leonard Richardson, The Ultra Gleeper: A Recommendation Engine for Web Pages, Feb. 2005, http://www.crummy.com/software/UltraGleeper/IntroPaper.html.

Daniel Billsus, et al., Invention Proposal for FXPAL IP-04-004: Recommendation Aggregation for Digest Generation, Fuji Xerox, Palo Alto, CA, USA.

* cited by examiner

Dear Walter,
Based on web sites you visited during the last 30 days, you might also want to consider the following sites, blogs or RSS feeds that may be of interest to you. Based on your personal settings, the sites below can be sorted by aggregated popularity and uniqueness.

| Site | RSS Feed | Distinct related pages you visited | Sort by Popularity | Sort by Uniqueness |
|---|---|---|---|---|
| Engadget | www.engadget.com/rss.xml | 49 | 0.6 | 0.2 |
| The Art of Drink | www.theartofdrink.com/rss.xml | 26 | 0.5 | 0.5 |
| Second Life Blog | secondlife.blogs.com/rss.xml | 23 | 0.4 | 0.8 |
| Vespa Way | www.vespaway.com/rss.xml | 8 | 0.2 | 0.7 |

SYSTEM AND METHOD FOR RECOMMENDING INFORMATION RESOURCES TO USER BASED ON HISTORY OF USER'S ONLINE ACTIVITY

DESCRIPTION OF THE INVENTION

1. Field of the Invention

This invention generally relates to technology for creating recommendations and, more specifically, to techniques for recommending information resources to a user based on history of user's online activity.

2. Description of the Related Art

According to various sources, there are about 75,000 new blogs added each day and 50,000 new blog posts added each hour. Without help identifying useful information sources, users risk missing highly relevant information, wasting too much time monitoring too many sources that are not particularly relevant, or simply giving up on the discovery of new information sources.

Social recommender systems have been developed to recommend new items to a user that a similar user has liked. Users are considered to be more similar if they share more items they like. Commercial sites such as Amazon and Netflix widely use this technique. In the area of search technology, Google's PageRank algorithm uses the number of pages that link to a given page to rank that page within the search results.

Various link analysis techniques have been applied, for example, to the blogosphere for answering diverse questions such as blog authority, described in Akshay Java, Pranam Kolari, Tim Finin, and Tim Oates, Feeds That Matter: A Study of Bloglines Subscriptions, TR CS 06-06, August 2006. In addition, the link analysis techniques have been applied to blog threads described in Shinsuke Nakajima, Junichi Tatemura, Yoichiro Hino, Yoshinori Hara, and Katsumi Tanaka, Discovering Important Bloggers Based on a Blog Thread Analysis, 2nd Annual Workshop on the Weblogging Ecosystem: Aggregation, Analysis and Dynamics, Chiba, Japan, May 10, 2005 and to differentiating splogs (spam blogs) from real blogs, as described in Pranam Kolari, Tim Finin, and Anupam Joshi, SVMs for the Blogosphere: Blog Identification and Splog Detection, AAAI Spring 2006 Symposia on Computational Approaches to Analysing Weblogs, AAAI-CAAW 2006, Mar. 27-29, 2006, Stanford University, Calif., USA.

Applications of the aforesaid link analysis techniques can already be found in products such as "GreatNews: the Intelligent RSS Reader" (http://www.curiostudio.com/index.html) that highlights important blog posts and implements a one-click button to let users subscribe to blogs that people encounter while reading the web. However, GreatNews ranks blog posts (not blogs) and does not use the user's web reading habits to identify the blogs in the first place: blogs are already subscribed to by the user.

In another example, BlogStreet available at http://www-.blogstreet.com finds other blogs that link to a particular blog, allowing a user to obtain a suggestion of blogs that are linked to a blog that the user already likes. The aforesaid BlogStreet finds other blogs given an existing blog, but does not find blogs based on a page or other Internet resource viewed by the user. Furthermore, it does not aggregate the ranks over time. In another example, Google's widget "Interesting Items For You" is an attempt to recommend pages or web searches based on a user's browsing history but it does not recommend blogs to users.

Starting with a user's blog subscriptions, the product known as Ultra Gleeper recommends web pages that a user is likely to be interested in and that he/she likely hasn't seen yet. However, it does not recommend blogs, but only web pages. "Share Your OPML" (http://share.opml.org) allows users to share their lists of subscriptions and then shows the top 100 most popular blogs. It also provides recommendations of subscription lists that are similar to user's own subscriptions. Rojo (www.rojo.com) is yet another way of discovering what blogs a community of users is currently reading. This tool lists the blogs read by the list of users who subscribed to Rojo.

Therefore, the existing technology fails to provide a system that automatically recommends information sources (such as blogs) based on analysis of incoming links to a user's personal web history (or peer group's web histories). Moreover, no existing system helps users discover information sources, and make informed choices about which information sources to monitor by answering the following questions: Which information sources are most closely related to my web browsing interests? Of those, which are most popular? Which break stories first? Which generate the most online discussion?

Existing solutions focus on rating or categorizing blogs without any personalization, or recommending blogs based on current blog subscriptions, but not based on actual reading behavior. Therefore, the conventional systems rely heavily on user's subscriptions and not on user's online activities and behaviors.

Thus, the existing technology generally fails to provide techniques for effectively helping users to discover information sources and make informed choices about which information sources to monitor.

SUMMARY OF THE INVENTION

The inventive methodology is directed to methods and systems that substantially obviate one or more of the above and other problems associated with conventional techniques for helping users discover information sources.

In accordance with an aspect of the inventive concept, there is provided a system that recommends information sources based on analysis of incoming links to a user's personal web history (or peer group web histories). The inventive system incorporates functionality for automated generation of a set of scores that reflect different qualities for each incoming link, including, but not limited to popularity, activity, recency, quickness, uniqueness, specificity and/or conciseness. The system also provides support for alternative site rankings, determined by aggregation over individual qualities (or combinations of qualities), according to users' preferences.

In accordance with another aspect of the inventive concept, there is provided a computer-implemented method. The inventive method involves: obtaining a history of online activities of a user; receiving user preference information from the user; identifying a plurality of online information resources linking to online resources viewed by the user, wherein each of the plurality of online information resources is associated with an online information source; generating a plurality of relevance scores for each of the identified online information resource; and using the generated plurality of relevance scores to generate a ranked list of recommended online information sources. In the inventive method, a rank of each online information source is determined by aggregating at least some of the plurality of relevance scores of the identified online information resources according to the received user preference information.

In accordance with yet another aspect of the inventive concept, there is provided a computerized system. The inventive system includes a web history collector module operable to obtain a history of online activities of a user; a user interface operable to receive user preference information from the user; a link analyzer module operable to identify a plurality of online information resources linking to online resources viewed by the user and generate a plurality of relevance scores for each of the identified online information resource; wherein each of the plurality of online information resources is associated with an online information source; and a recommender module operable to use the generated plurality of relevance scores to generate a ranked list of recommended online information sources. In the inventive system, a rank of each online information source is determined by aggregating at least some of the plurality of relevance scores of the identified online information resources according to the received user preference information.

In accordance with further aspect of the inventive concept, there is provided a computer readable medium embodying a computer executable instructions implementing a method involving: obtaining a history of online activities of a user; receiving user preference information from the user; identifying a plurality of online information resources linking to online resources viewed by the user, wherein each of the plurality of online information resources is associated with an online information source; generating a plurality of relevance scores for each of the identified online information resource; and using the generated plurality of relevance scores to generate a ranked list of recommended online information sources. In the aforesaid method, a rank of each online information source is determined by aggregating at least some of the plurality of relevance scores of the identified online information resources according to the received user preference information.

Additional aspects related to the invention will be set forth in part in the description which follows, and in part will be obvious from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive technique. Specifically.

DETAILED DESCRIPTION

In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense. Additionally, the various embodiments of the invention as described may be implemented in the form of a software running on a general purpose computer, in the form of a specialized hardware, or combination of software and hardware.

An embodiment of the inventive technique does not rank the page based on its incoming links, but ranks the blogs that link to the page based upon the implied relevance the user has given the page by viewing it. In accordance with an embodiment of the invention, there is provided a novel method for automatically discovering blogs as well as other similar information resources based on what users are reading or viewing or have read or viewed on the web. The inventive methodology helps users identify highly relevant information sources and avoid attempting to monitor an abundance of less relevant sources. It is an improvement over existing blog recommendation systems because it rates blogs with respect to a specific person or group's interests as expressed through their own web browsing behaviors.

In accordance with an embodiment of the present invention, blogs (and other information sources) are recommended to a user based on his or her history of online activities, such as web browsing history of the user. The aforesaid exemplary embodiment of the inventive system: (1) processes the user's web browsing history, (2) identifies blog posts (and other web information resources such as web pages) that link to pages viewed by the user, (3) generates multiple relevance scores for each identified post or page, and (4) produces multiple rankings of the corresponding source blogs (and web sites) by aggregating individual relevance scores (or combinations of relevance scores), according to users' preferences. Thus, the inventive system provides for the discovery of information sources that are likely to be interesting to the user and allows sources lost in the "long tail" to be seamlessly discovered.

The algorithmic details of the invention will now be described in detail. The implementation, scoring and aggregation details provided herein represent only one of many alternative ways to implement the general inventive link-analysis-based recommendation approach. Thus, the inventive concept is not limited to the described implementations and the scoring and aggregation algorithms or any other specific implementations and algorithms.

Figure 1:
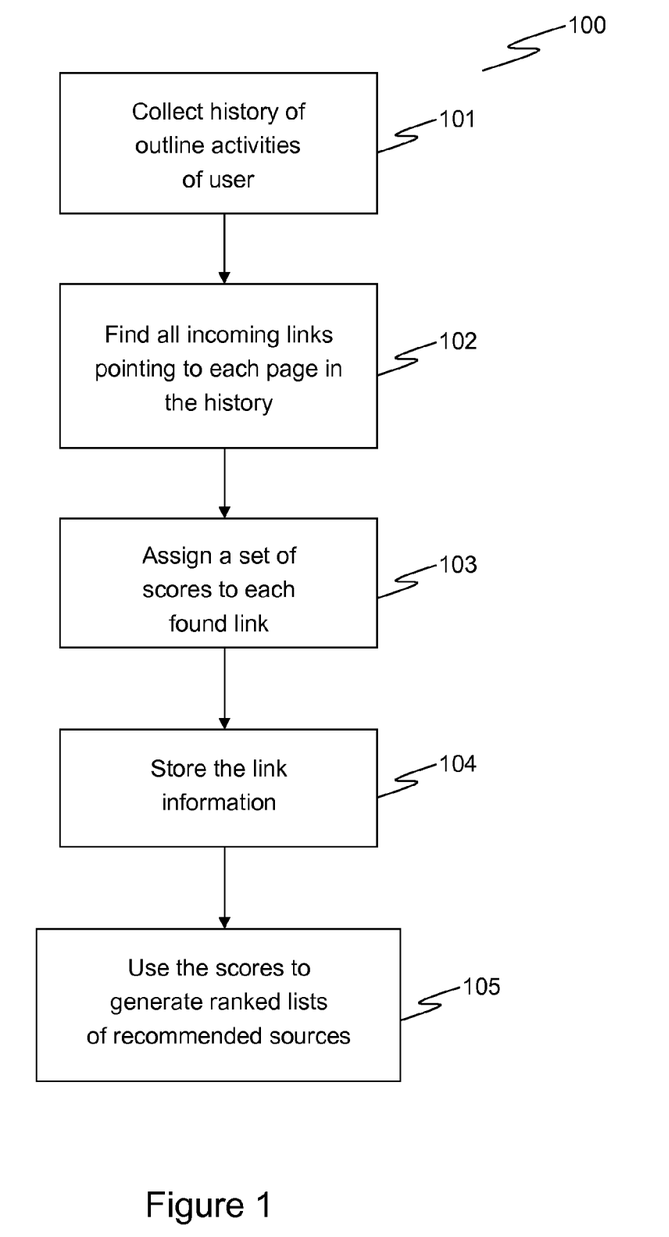
FIG. 1 illustrates exemplary operating sequence of the inventive suggestion generation module.

Conceptually, the inventive approach includes four main components: a web history collector, a link analyzer, a recommender and a user interface, each of which will be described in detail below. The inventive system will be described in conjunction with exemplary operating flow thereof illustrated in FIG. 1.

Web history collector. The web history collector collects history of online activities of the user and provides information about the pages visited by a user as well as history of user's other online activities to other modules of the system, see step 101 in FIG. 1. For example, one embodiment of this component is a browser toolbar or plug-in that transmits the URL of visited web pages to the link analyzer. An alternative embodiment of the history collector reads a browser's existing history log and transmits it to the link analyzer. Yet another embodiment is a proxy that keeps track of visited web pages or other Internet resources. The web history collector may also aggregate the browsing history of a peer group of users.

Link analyzer. The link analyzer receives information about visited URLs from the web history collector. For each such visited URL, the link analyzer determines all incoming links, e.g. a collection of all Internet resources that have a link pointing to the web resource visited by the user, see step 102 in FIG. 1. In one embodiment, the aforesaid incoming links may be determined, for example, by issuing the following query to the Google search engine: link:www.domain.com/pageTheUserVisited. For each incoming link, the link analyzer generates a set of relevance scores based on several distinct criteria, which will be described in detail below, see FIG. 1, step 103. The link analyzer stores information on each analyzed incoming link, along with the original visited URL, the user's identification information, date and time of access, and computed relevance scores, see step 104. This information may be stored into a database or to any other information storage structure.

Recommender. The recommender uses the scored incoming links to generate one or more ranked lists of recommended sites or other online information sources, see step 105 in FIG. 1. The rankings are based on an aggregation of the identified relevance scores of posts over a specified period of time. The inventive system enables the user (or application provider) to decide which relevance score (or combination of scores) to use for the final recommendation rankings.

User interface. The user interface communicates ranked lists of recommendations to the user, either when specifically requested by the user, proactively, based on a certain application event, or periodically (e.g. daily, weekly, monthly). The user interface also allows the user to specify the ranking criteria. The user interface also enables the user to indicate that certain sites should not be included in future recommendations.

The generation of various relevance scores will now be described in detail. Specifically, the following description provides details about a set of distinct relevance scores that the link analyzer component can determine automatically. For simplicity, the pages in the user's history are referred to as visited pages, pages with outgoing links pointing to visited pages are referred to as posts (e.g. a blog post), and the corresponding feeds or domains of posts as sources (e.g. www.engadget.com). Even though the description below refers to pages with outgoing links pointing to visited pages as posts, these pages may contain any type of information, including text, still images, videos, sounds, and the like. In other words, the aforesaid pages do not have to be serial content (ie, blog posts) but can be any sort of web page or article.

Popularity. The popularity score indicates the number of other web pages that link to the subject post. The aforesaid number of linking pages can be determined using any one of well-known methods, which include Trackback, Pingback and Refback, or any combination thereof. All three methods enable web authors to obtain notifications when other authors link to one of their documents.

Activity. The activity score indicates the number of comments that the specific linking post has generated. The activity score is mostly utilized in the context of web blogs. This number can be obtained from the post itself.

Recency. The recency score indicates the age of the post relative to the current date or date and time.

Quickness. The quickness score indicates the position of a post in a temporally ordered list of posts that refer to the visited page. The posts on the list may be ordered based on their creation or modification time, such that the posts, which linked to the visited page first are placed at the top of the list.

Uniqueness. The uniqueness score reflects the inverse of the number of posts from all sources that refer to the same visited page.

Specificity. The specificity score reflects the inverse of the frequency of links to the visited page within the source.

Conciseness. The conciseness score represents the length of the post.

The inventive algorithm for recommendation generation will now be described. The main principle underlying the inventive recommendation approach is to restrict the persisted data to a time range of interest (e.g. today, last week, last month), to identify frequently persisted sources within this data subset, and to rank these sources based on frequency, relevance scores (one or more of the scores listed above) and/or combinations thereof.

Aggregate scores are determined for each source, using the individual scores assigned to posts originating from that source. As part of the aggregation, other qualities that refer to the source of posts as a whole may also be incorporated into the aggregate scores of the sources. Such additional qualities may include:

Source Reputation/Popularity. This quality can be calculated using, for example, the PageRank of the source. As well-known in the art, the aforesaid PageRank is a link analysis algorithm that assigns a numerical weighting to each element of a hyperlinked set of documents, such as the World Wide Web, with the purpose of "measuring" its relative importance within the set. The assigned PageRank score is dependent on the number of other pages linking to the source.

Source Peer Popularity. This quality may be based on the frequency with which this source is recommended, for example by the inventive structure described herein, to others within a peer group.

Source Precision. This quality may be measured using the ratio of the number of posts from the source that link to the visited page(s) to total number posts from a source.

Source Uniqueness. This quality may be represented by the inverse of the number of times a visited page linked from the source is also linked from another source, or the average post uniqueness.

Figure 2:
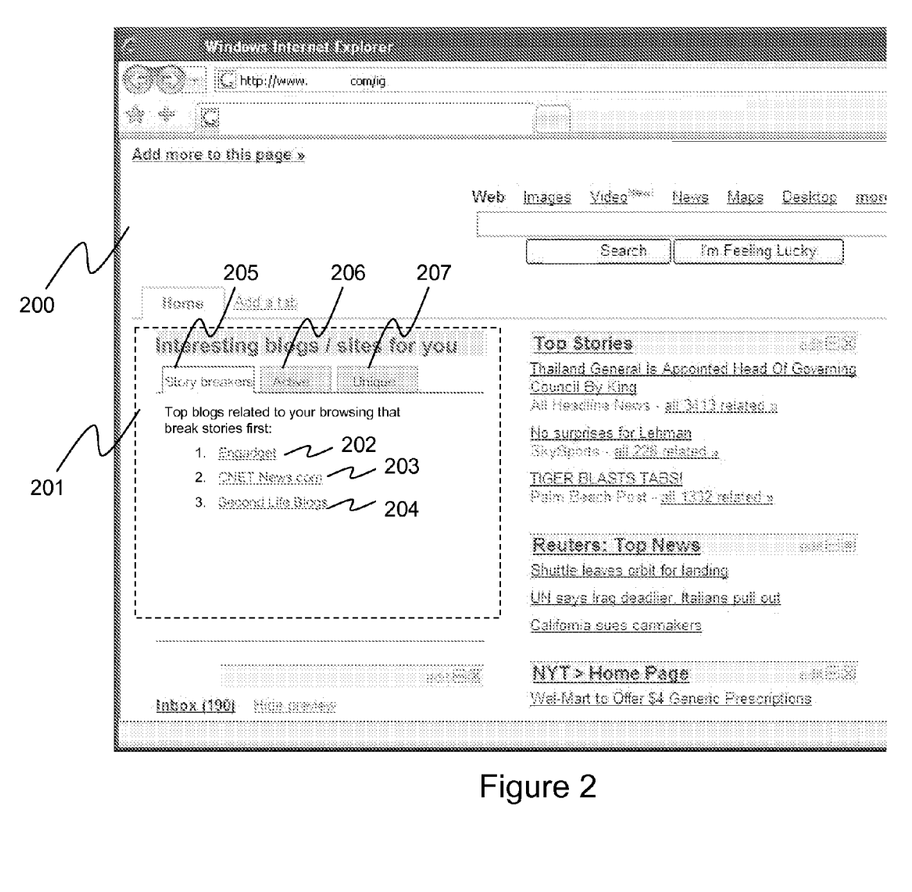
FIG. 2 illustrates an exemplary embodiment of a personal web gadget that suggests blogs/sites based on history of user's online activities—"Story breakers".
Figure 3:
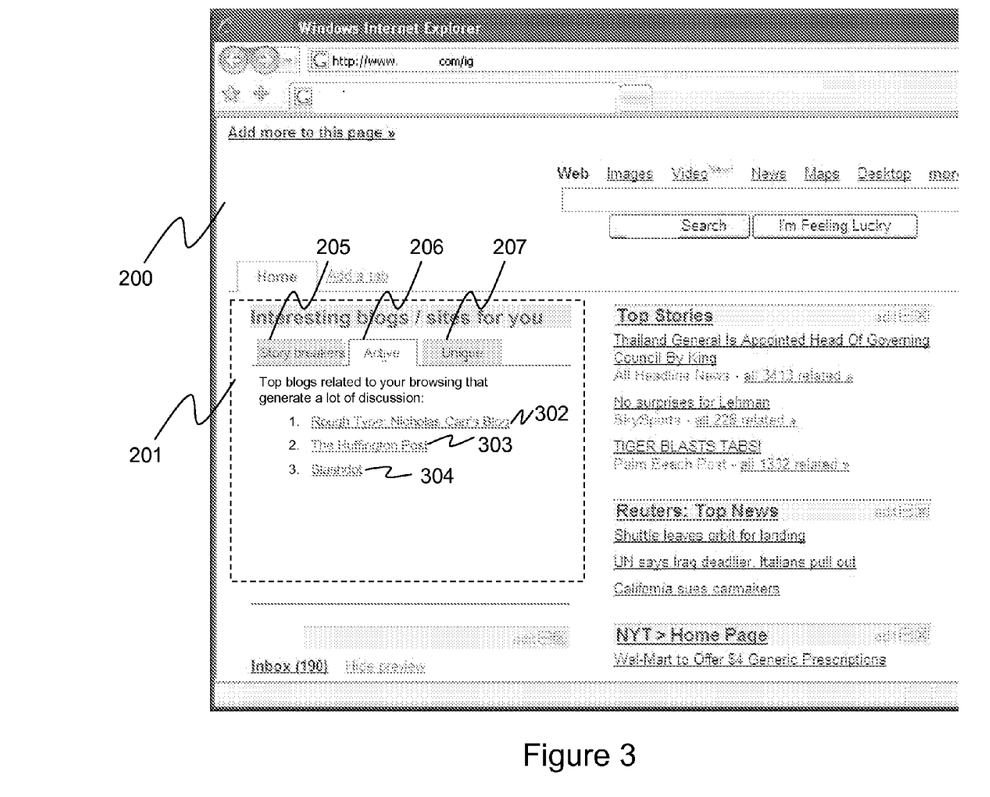
FIG. 3 illustrates an exemplary embodiment of a personal web gadget that suggests blogs based on history of user's online activities—"Most Active".
Figure 4:
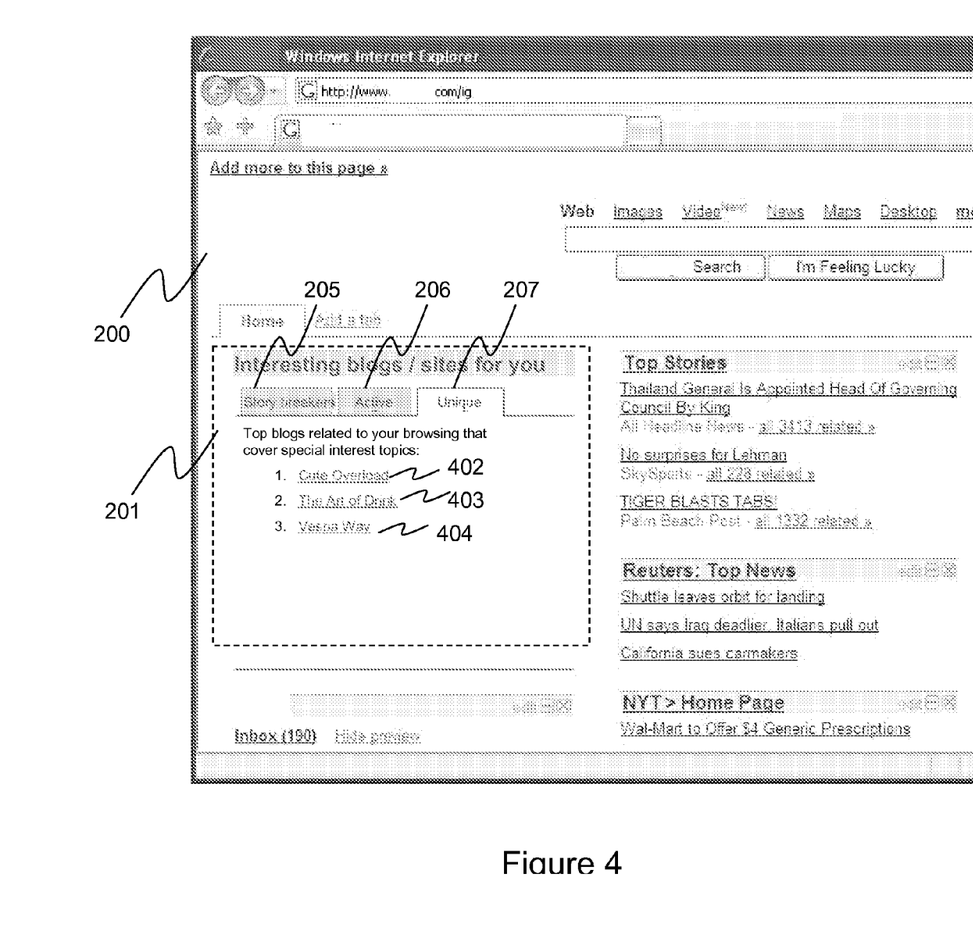
FIG. 4 illustrates an exemplary embodiment of a personal web gadget that suggests blogs based on history of user's online activities—"Most Unique".

The inventive user interface will now be described. Specifically, the generated recommendations may be communicated to the user in multiple different ways. For example, in one embodiment, recommendations can be rendered in a web gadget that users can embed in a personal web portal, such user's personal homepage. Exemplary user interfaces in accordance with this embodiment are illustrated in Figures 2 through 4. Specifically, FIG. 2 illustrates a personal web portal page 200 having an embedded web gadget 201. In the embodiment shown in FIG. 2, the web gadget 201 incorporates tabs 205, 206 and 207. Activation of each of the tabs 205, 206 and 207 causes the suggestions 202, 203 and 204 to be displayed to the user. The displayed suggestions are being ranked on the screen based on distinct relevance score characteristics assigned to the corresponding tab. For example, in the embodiment of web portal illustrated in FIG. 2, the suggested posts 202, 203 and 204 are ranked based on the quickness score discussed hereinabove, which corresponds to the activated "Story Breakers" tab.

In FIG. 3, the suggested posts 302, 303 and 304 are ranked based on the activity score described hereinabove, which corresponds to the activated "Active" tab 206 in the web gadget 201. In FIG. 4, on the other hand, the suggested posts 402, 403 and 404 are ranked based on the uniqueness score described hereinabove, which corresponds to the activated "Unique" tab 207 in the web gadget 201.

Figure 5:
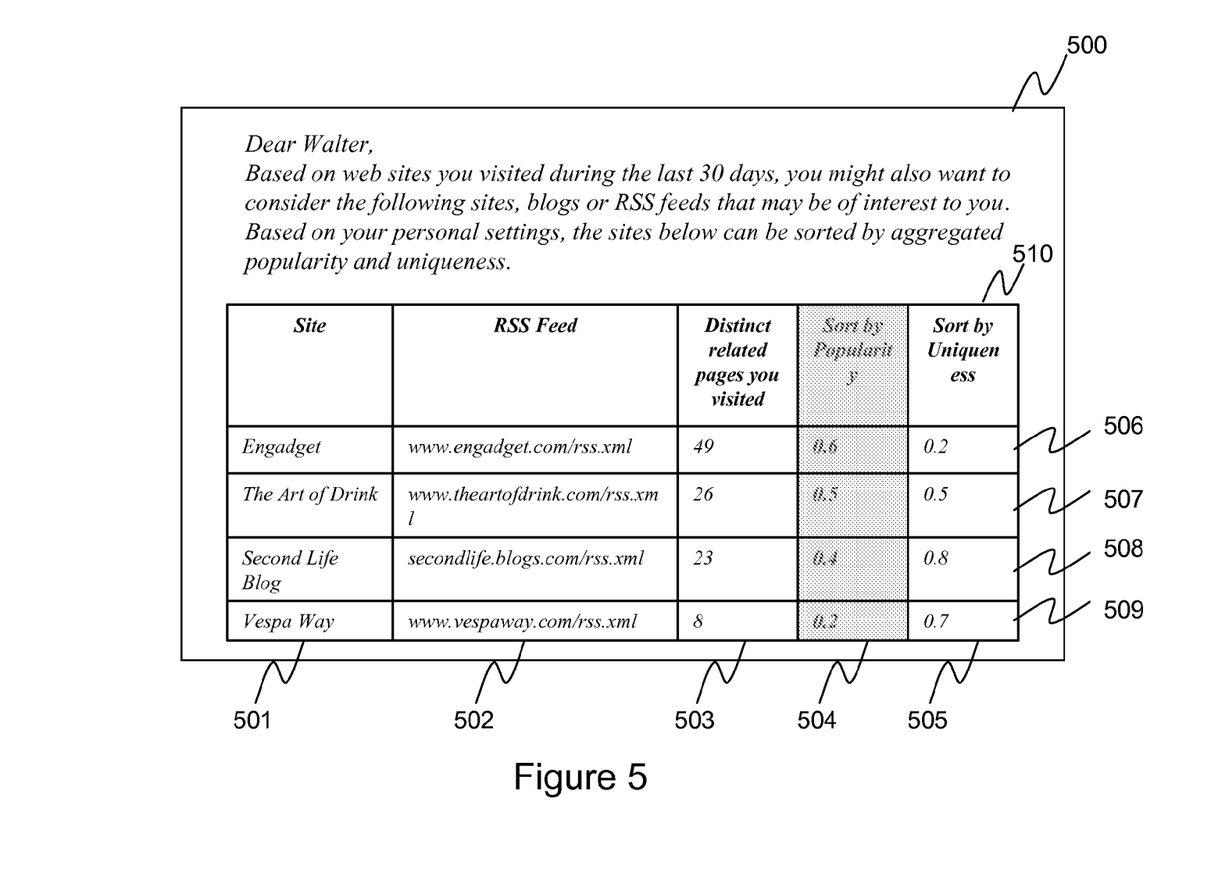
FIG. 5 illustrates an exemplary embodiment of a personal ranked list sent via email.

In another alternative embodiment of the invention, the user interface is implemented as a ranked list of suggested posts, which is sent out to the user by the inventive system via email. To this end, the inventive system may incorporate an email gateway or other similar functionality. An exemplary implementation of such emailed list is shown in FIG. 5. This figure illustrates email 500, which incorporates suggestion table 510. Column 501 of the suggestion table 510 contains the name of the recommended site, while column 502 lists the corresponding RSS feed information. The RSS feed information enables the user to use one of the known RSS readers to handle the listed blogs. The column 503 lists the number of distinct web pages previously visited by the user, which are linked from the corresponding site listed in column 501. Columns 504 and 505 list the popularity and uniqueness score values of the listed sites. The table shown in FIG. 5 includes four rows 506, 507, 508 and 509, each of which corresponds to a separate suggested site.

In another embodiment, access to recommendations is provided as part of the user interface for a feed reader or aggregator. Specifically, whenever the user adds a new feed to his or her watched feeds, the user interface could recommend other related feeds (based on the analyses described above) that possess alternative qualities, such as being more popular, more likely to break stories first, or possessing higher "source precision" with respect to the user's web browsing interests.

It should be further noted that the inventive system does not need to incorporate all of the described functionality itself. One exemplary implementation of the inventive system may employ third-party services for discovering or indexing all the blogs. Further, in one embodiment, the inventive system may be configured to generate recommendations based on online activities of a group of users. To this end, the online activity histories of multiple users within the group are combined and the inventive algorithm described hereinabove is applied to the combined history.

Figure 6:
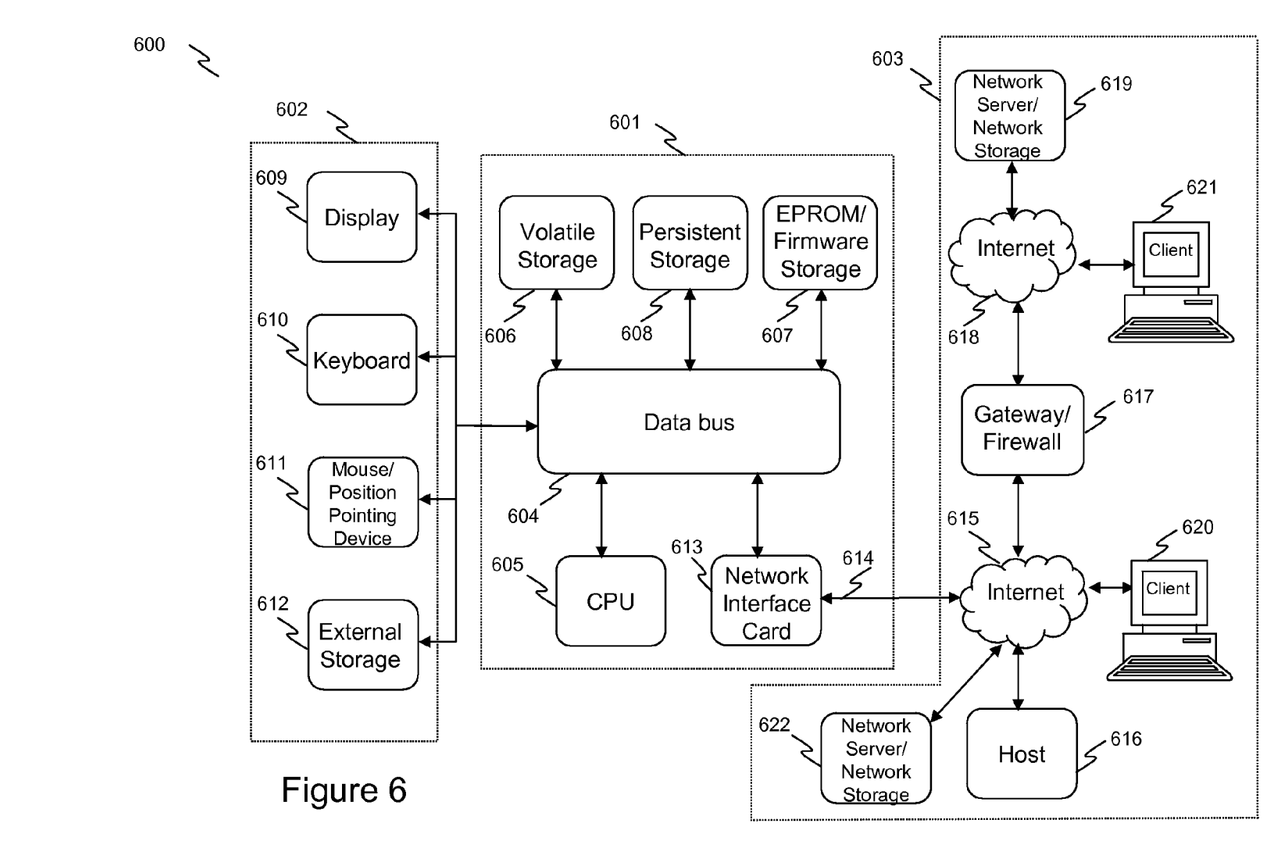
FIG. 6 illustrates an exemplary embodiment of a computer platform upon which the inventive system may be implemented.

FIG. 6 is a block diagram that illustrates an embodiment of a computer/server system 500 upon which an embodiment of the inventive methodology may be implemented. The system 500 includes a computer/server platform 601, peripheral devices 502 and network resources 503.

The computer platform 501 may include a data bus 504 or other communication mechanism for communicating information across and among various parts of the computer platform 501, and a processor 505 coupled with bus 501 for processing information and performing other computational and control tasks. Computer platform 501 also includes a volatile storage 506, such as a random access memory (RAM) or other dynamic storage device, coupled to bus 504 for storing various information as well as instructions to be executed by processor 505. The volatile storage 506 also may be used for storing temporary variables or other intermediate information during execution of instructions by processor 505. Computer platform 501 may further include a read only memory (ROM or EPROM) 507 or other static storage device coupled to bus 504 for storing static information and instructions for processor 505, such as basic input-output system (BIOS), as well as various system configuration parameters. A persistent storage device 508, such as a magnetic disk, optical disk, or solid-state flash memory device is provided and coupled to bus 501 for storing information and instructions.

Computer platform 501 may be coupled via bus 504 to a display 509, such as a cathode ray tube (CRT), plasma display, or a liquid crystal display (LCD), for displaying information to a system administrator or user of the computer platform 501. An input device 510, including alphanumeric and other keys, is coupled to bus 501 for communicating information and command selections to processor 505. Another type of user input device is cursor control device 511, such as a mouse, a trackball, or cursor direction keys for communicating direction information and command selections to processor 504 and for controlling cursor movement on display 509. This input device typically has two degrees of freedom in two axes, a first axis (e.g., x) and a second axis (e.g., y), that allows the device to specify positions in a plane.

An external storage device 512 may be connected to the computer platform 501 via bus 504 to provide an extra or removable storage capacity for the computer platform 501. In an embodiment of the computer system 500, the external removable storage device 512 may be used to facilitate exchange of data with other computer systems.

The invention is related to the use of computer system 500 for implementing the techniques described herein. In an embodiment, the inventive system may reside on a machine such as computer platform 501. According to one embodiment of the invention, the techniques described herein are performed by computer system 500 in response to processor 505 executing one or more sequences of one or more instructions contained in the volatile memory 506. Such instructions may be read into volatile memory 506 from another computer-readable medium, such as persistent storage device 508. Execution of the sequences of instructions contained in the volatile memory 506 causes processor 505 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 505 for execution. The computer-readable medium is just one example of a machine-readable medium, which may carry instructions for implementing any of the methods and/or techniques described herein. Such a medium may take many forms, including but not limited to, non-volatile media, volatile media, and transmission media. Non-volatile media includes, for example, optical or magnetic disks, such as storage device 508. Volatile media includes dynamic memory, such as volatile storage 506. Transmission media includes coaxial cables, copper wire and fiber optics, including the wires that comprise data bus 504.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, a flash drive, a memory card, any other memory chip or cartridge, a carrier wave as described hereinafter, or any other medium from which a computer can read.

Various forms of computer readable media may be involved in carrying one or more sequences of one or more instructions to processor 505 for execution. For example, the instructions may initially be carried on a magnetic disk from a remote computer. Alternatively, a remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on the data bus 504. The bus 504 carries the data to the volatile storage 506, from which processor 505 retrieves and executes the instructions. The instructions received by the volatile memory 506 may optionally be stored on persistent storage device 508 either before or after execution by processor 505. The instructions may also be downloaded into the computer platform 501 via Internet using a variety of network data communication protocols well known in the art.

The computer platform 501 also includes a communication interface, such as network interface card 513 coupled to the data bus 504. Communication interface 513 provides a two-way data communication coupling to a network link 514 that is connected to a local network 515. For example, communication interface 513 may be an integrated services digital network (ISDN) card or a modem to provide a data communication connection to a corresponding type of telephone line. As another example, communication interface 513 may be a local area network interface card (LAN NIC) to provide a data communication connection to a compatible LAN. Wireless links, such as well-known 802.11a, 802.11b, 802.11g and Bluetooth may also used for network implementation. In any such implementation, communication interface 513 sends and receives electrical, electromagnetic or optical signals that carry digital data streams representing various types of information.

Network link 513 typically provides data communication through one or more networks to other network resources. For example, network link 514 may provide a connection through local network 515 to a host computer 516, or a network storage/server 517. Additionally or alternatively, the network link 513 may connect through gateway/firewall 517 to the wide-area or global network 518, such as an Internet. Thus, the computer platform 501 can access network resources located anywhere on the Internet 518, such as a remote network storage/server 519. On the other hand, the computer platform 501 may also be accessed by clients located anywhere on the local area network 515 and/or the Internet 518. The network clients 520 and 521 may themselves be implemented based on the computer platform similar to the platform 501.

Local network 515 and the Internet 518 both use electrical, electromagnetic or optical signals that carry digital data streams. The signals through the various networks and the signals on network link 514 and through communication interface 513, which carry the digital data to and from computer platform 501, are exemplary forms of carrier waves transporting the information.

Computer platform 501 can send messages and receive data, including program code, through the variety of network(s) including Internet 518 and LAN 515, network link 514 and communication interface 513. In the Internet example, when the system 501 acts as a network server, it might transmit a requested code or data for an application program running on client(s) 520 and/or 521 through Internet 518, gateway/firewall 517, local area network 515 and communication interface 513. Similarly, it may receive code from other network resources.

The received code may be executed by processor 505 as it is received, and/or stored in persistent or volatile storage devices 508 and 506, respectively, or other non-volatile storage for later execution. In this manner, computer system 501 may obtain application code in the form of a carrier wave.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention. For example, the described software may be implemented in a wide variety of programming or scripting languages, such as Assembler, C/C++, perl, shell, PHP, Java, etc.

Moreover, other implementations of the invention will be apparent to those skilled in the art from consideration of the specification and practice of the invention disclosed herein. Various aspects and/or components of the described embodiments may be used singly or in any combination in the computerized suggestion generation engine. It is intended that the specification and examples be considered as exemplary only, with a true scope and spirit of the invention being indicated by the following claims.

What is claimed is:

1. A method implemented within a computer system comprising a central processing unit (CPU) and a random access memory (RAM), the method comprising:
   a. utilizing the CPU and RAM to obtain a history of online activities of a user;
   b. utilizing the CPU and RAM to receive user preference information from the user;
   c. utilizing the CPU and RAM to identify a plurality of online information resources linking to online resources viewed by the user, wherein each of the plurality of online information resources is associated with an online information source;
   d. utilizing the CPU and RAM to generate a plurality of relevance scores for each of the identified online information resource; and
   e. using the generated plurality of relevance scores to generate a ranked list of recommended online information sources, wherein a rank of each online information source is determined by aggregating at least some of the plurality of relevance scores of the identified online information resources according to the received user preference information,
   wherein:
      the ranked list comprises links to online sources that are not in the history of the online activities of the user,
      the online information resource is a blog post,
      the online resource viewed by the user is a visited web page,
      the online information source is a source blog web page, and
      the online source is a related web feed.

2. The method of claim 1, wherein the history of online activities of the user comprises user's web browsing history.

3. The method of claim 1, wherein the history of online activities of the user is collected by intercepting requests of the user for Internet resources and transmitting the information on the requested online resources to a link analyzer.

4. The method of claim 1, wherein the identifying of the plurality of online information resources linking to online resources viewed by the user is performed by issuing a query to an online search engine.

5. The method of claim, wherein prior to the identifying, the history of online activities of the user is combined with online activities history of at least one other user.

6. The method of claim 1, wherein the generated plurality of relevance scores comprises a popularity score indicating a number of other online resources linking to the identified online information resource.

7. The method of claim 1, wherein the generated plurality of relevance scores comprises an activity score indicating a number of comments generated by the identified online information resource.

8. The method of claim 1, wherein the generated plurality of relevance scores comprises a recency score indicating an age of the identified online information resource relative to a current date.

9. The method of claim 1, wherein the generated plurality of relevance scores comprises a quickness score indicating a position of the identified online information resource in a temporarily ordered list of online information resources pointing to the online resource viewed by the user.

10. The method of claim 1, wherein the generated plurality of relevance scores comprises a uniqueness score representing an inverse of a number of online resources from all sources referring to the online resource viewed by the user.

11. The method of claim 1, wherein the generated plurality of relevance scores comprises a specificity score representing an inverse of a frequency of links to the online resource viewed by the user from the identified online information resource.

12. The method of claim 1, wherein the generated plurality of relevance scores comprises a conciseness score representing a length of the identified online information resource.

13. The method of claim 1, wherein generating a ranked list of recommended online information sources comprises calculating an aggregate score for each online information source by combining at least some of the plurality of relevance scores corresponding to identified online information resources associated with the online information sources.

14. The method of claim 13, wherein the aggregate score is further based on popularity of the online information source.

15. The method of claim 13, wherein the aggregate score is further based on peer popularity of the online information source.

16. The method of claim 13, wherein the aggregate score is further based on precision of the online information source.

17. The method of claim 13, wherein the aggregate score is further based on uniqueness of the online information source.

18. The method of claim 1, further comprising displaying the generated ranked list of recommended online information sources to the user.

19. The method of claim 18, wherein the generated ranked list of recommended online information sources is displayed by incorporating into a personal web page of the user.

20. The method of claim 18, wherein the generated ranked list of recommended online information sources is provided to the user via email.

21. The method of claim 1, wherein the user preference information comprises ranking criteria.

22. A computerized system comprising:
  a. a web history collector module operable to obtain a history of online activities of a user;
  b. a user interface operable to receive user preference information from the user;
  c. a link analyzer module operable to identify a plurality of online information resources linking to online resources viewed by the user and generate a plurality of relevance scores for each of the identified online information resource, wherein each of the plurality of online information resources is associated with an online information source;
  d. a recommender module operable to use the generated plurality of relevance scores to generate a ranked list of recommended online information sources, wherein a rank of each online information source is determined by aggregating at least some of the plurality of relevance scores of the identified online information resources according to the received user preference information; and
  e. a display operable to display the generated ranked list of recommended online information sources to the user,
  wherein:
    the ranked list comprises links to online sources that are not in the history of the online activities of the user,
    the online information resource is a blog post,
    the online resource viewed by the user is a visited web page,
    the online information source is a source blog web page, and
    the online source is a related web feed.

23. A non-transitory computer readable medium embodying a computer executable instructions implementing a method comprising:
  a. obtaining a history of online activities of a user;
  b. receiving user preference information from the user;
  c. identifying a plurality of online information resources linking to online resources viewed by the user, wherein each of the plurality of online information resources is associated with an online information source;
  d. generating a plurality of relevance scores for each of the identified online information resource; and
  e. using the generated plurality of relevance scores to generate a ranked list of recommended online information sources, wherein a rank of each online information source is determined by aggregating at least some of the plurality of relevance scores of the identified online information resources according to the received user preference information,
  wherein:
    the ranked list comprises links to online sources that are not in the history of the online activities of the user,
    the online information resource is a blog post,
    the online resource viewed by the user is a visited web page,
    the online information source is a source blog web page, and
    the online source is a related web feed.

24. The method of claim 1, wherein the identified plurality of online information resources are linked to online resources viewed by the user through a use of a link in the online information resource which points to the online resource viewed by the user.

25. The method of claim 1, wherein obtaining a history of online activities of a user further comprises obtaining a list of online resources viewed by the user.

* * * * *